(12) United States Patent
Engracia, Jr. et al.

(10) Patent No.: US 11,828,987 B2
(45) Date of Patent: Nov. 28, 2023

(54) AXIALLY ADJUSTED, NON-ROTATING BARREL FIBER COLLIMATOR

(71) Applicant: ECI TECHNOLOGY, INC., Totowa, NJ (US)

(72) Inventors: Edgardo H. Engracia, Jr., Edison, NJ (US); Ariel Faynerman, Hackensack, NJ (US); Robert Cosmas, Secaucus, NJ (US)

(73) Assignee: KLA CORPORATION, Milpitas, CA (US)

( * ) Notice: Subject to any disclaimer, the term of this patent is extended or adjusted under 35 U.S.C. 154(b) by 156 days.

(21) Appl. No.: 16/712,248

(22) Filed: Dec. 12, 2019

(65) Prior Publication Data

US 2020/0192030 A1    Jun. 18, 2020

Related U.S. Application Data

(60) Provisional application No. 62/779,239, filed on Dec. 13, 2018.

(51) Int. Cl.
*G02B 6/32* (2006.01)
*G02B 27/30* (2006.01)

(52) U.S. Cl.
CPC .............. *G02B 6/32* (2013.01); *G02B 27/30* (2013.01)

(58) Field of Classification Search
CPC .......... G02B 7/023; G02B 7/004; G02B 7/08; G02B 26/005; G02B 26/10; G02B 27/30; G02B 27/40; G02B 3/14; G02B 5/126; G02B 6/32; G02B 6/3624; G02B 7/021; G02B 7/022; G02B 7/14; G03B 17/12; G03B 17/14; G03B 2205/0053; G03B 30/00; G03B 17/02; G03B 27/326; G03B 3/02; H04N 5/2254; H04N 5/2251; H04N 5/2252; H04N 5/2253; H04N 5/2257
See application file for complete search history.

(56) References Cited

U.S. PATENT DOCUMENTS

| | | | | |
|---|---|---|---|---|
| 4,812,009 A | * | 3/1989 | Carlisle | G02B 6/3869 385/62 |
| 5,677,799 A | * | 10/1997 | Huang | G02B 7/04 359/819 |
| 5,917,985 A | | 6/1999 | Im | |
| 6,801,688 B1 | | 10/2004 | Stubbs et al. | |
| 7,208,855 B1 | * | 4/2007 | Floyd | G02B 6/4427 310/71 |
| 10,215,927 B2 | | 2/2019 | Tong et al. | |

(Continued)

FOREIGN PATENT DOCUMENTS

CN    102081199 A    6/2011
CN    105652462 A    6/2016

(Continued)

OTHER PUBLICATIONS

Office Action dated Dec. 2, 2020 corresponding to Japanese Patent Application No. 2019-225676 with English Translation.

*Primary Examiner* — Brandi N Thomas
(74) *Attorney, Agent, or Firm* — Baker Botts L.L.P.

(57) ABSTRACT

Systems and methods for adjusting a distance of an optical fiber end to a lens assembly are provided. Methods include adjusting a movement of an inner barrel in just one axis while preventing the inner barrel from spinning.

4 Claims, 3 Drawing Sheets

(56) References Cited

U.S. PATENT DOCUMENTS

2006/0268423 A1* 11/2006 Ho .................. G02B 27/62
                                                                               359/641
2006/0285800 A1* 12/2006 Tatum .................. G02B 6/4225
                                                                               385/52
2018/0156983 A1    6/2018 Watte et al.

FOREIGN PATENT DOCUMENTS

| JP | H02-119613 U | 9/1990 |
| JP | H 04-145401 A | 5/1992 |
| JP | H06-37809 U | 5/1994 |
| JP | H10-186170 A | 7/1998 |
| WO | WO 97/15853 A1 | 5/1997 |

* cited by examiner

AXIALLY ADJUSTED, NON-ROTATING BARREL FIBER COLLIMATOR

RELATED APPLICATIONS

This application claims priority to U.S. Provisional Patent Application No. 62/779,239 filed Dec. 13, 2018, the disclosure of which is hereby incorporated by reference herein in its entirety.

BACKGROUND

Collimation is a process by which divergent beams of radiation or particles (e.g., light rays) are converted into parallel beams. In the field of fiber optics, fiber collimators can be used to couple free-space beams or light sources to optical fibers. Alternatively, or additionally, fiber collimators can be used to couple light beams between two fibers Various collimating lenses suited for fiber optics applications are available commercially. For instance, the 74-series Collimating lenses available from Ocean Optics, including the 74-UV and 74-VIS collimating lenses, can be coupled with SMA terminated optical fibers and other sampling optics to convert divergent beams of radiation (light) into a parallel beam. Each lens can be 5 mm in diameter, having a focal length of 10 mm and responsive at UV-Vis or Vis-NIR wavelengths. The focus of the collimating lens can be adjusted by loosening a set screw on the fiber barrel of the light source and sliding the inner barrel of the collimating lens of the light source.

Another commercially available fiber optic collimation lens from Ocean Optics is the SE-112689. It can be used to couple optical fibers with SMA connectors to a quartz collimating lens. The assembly includes a threaded SMA barrel that can be adjusted for focus or removed to allow connection to spectrometers and light sources with SMA fiber ports.

However, precise alignment of optics can be essential to effectively couple light form one medium to another. In order to ensure that light is well collimated, the light source can be positioned one focal length away from the collimating lens. There exists a need for an improved fiber collimator technique to provide for precise positional control of each of the members of an optical setup.

SUMMARY

Systems and methods for adjusting distance between an optical fiber end and a lens assembly are disclosed herein. In an exemplary embodiment, the disclosed subject matter provides a fiber positioning device that includes an inner barrel that is adjustable in one axis and prevented from spinning.

In certain embodiments, the fiber positioning device can include a threaded barrel, a lens assembly, and a threaded adjustment knob. The threaded barrel can be configured to accept an optical cable, and the distance between the threaded barrel and the lens assembly can be adjustable by turning the adjustment knob that engages the inner barrel via screw threads.

In certain embodiments, the fiber positioning device can further include a machined grove that can accept a fastener that prevents the threaded barrel from rotating.

In certain embodiments, the fastener can be one of a set screw, a bolt, or a dowel.

In certain embodiments, the lens assembly can include a collimating lens.

In certain embodiments, the system is vacuum-use compatible.

Methods for adjusting a distance between a lens assembly and an optical fiber are also described. In certain embodiments, an exemplary method includes moving a threaded barrel using a knurled outer adjuster that engages the barrel via screw threads. The threaded barrel can be configured to accept an optical cable.

In certain embodiments, the method can further include preventing the threaded barrel from rotating by a fastener.

In certain embodiments, the method can further include preventing the adjustment knob from rotating by a locking nut.

The accompanying drawings, which are incorporated and constitute part of this disclosure, illustrate preferred embodiments of the invention and serve to explain the principles of the disclosed subject matter.

Figure 1:
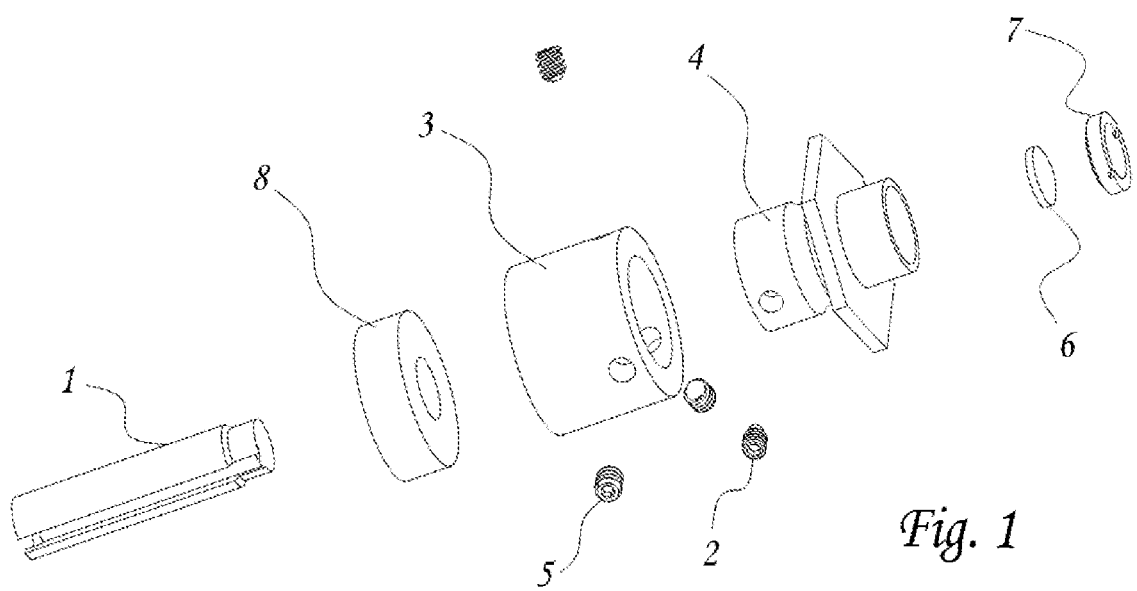
FIG. 1 is a perspective view of an axially adjusted, non-rotating barrel fiber collimator according to some embodiments of the disclosed subject matter.

Throughout the drawings, the same reference numerals and characters, unless otherwise stated, are used to denote like features, elements, components or portions of the illustrated embodiments. Moreover, while the disclosed subject matter will now be described in detail with reference to the Figs., it is done so in connection with the illustrative embodiments.

DETAILED DESCRIPTION

The disclosed subject matter provides fiber collimator devices, and methods for positioning an optical fiber end are discussed herein. The fiber positioning device described herein can include an inner barrel that is adjustable along one axis and prevented from spinning. This not only allows for a precise axial adjustment of distance of a fiber end to a lens assembly to adjust for focus, but also can ensure that the fiber optic cable is not turned in the process. Therefore, a loosening of the fiber optic cable can be avoided when the distance is adjusted.

The terminology used herein is for the purpose of describing particular embodiments only and is not intended to be limiting of the disclosed subject matter. As used herein, the term precise axial adjustment refers to movement of a part along one axis in substantially minimally practicable increments. As used herein, the term "and/or" includes any and all combinations of one or more of the associated listed items. As used herein, the singular forms "a," "an," and "the" are intended to include plural forms as well as singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the term "lens assembly" refers to one or more lenses. In certain embodiments, "lens assembly" refers to a single lens. In certain embodiments, "lens assembly" refers to two or more lenses.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

FIG. 1 is a perspective view of an axially adjusted, non-rotating barrel fiber collimator according to some embodiments of the disclosed subject matter. The device includes a threaded barrel 1, which is configured to accept a fiber optic cable. In certain nonlimiting embodiments, the threaded barrel can have a diameter of about ¼ inch with 28 threads per inch. In other nonlimiting embodiments, the threaded barrel can have more than 28 threads per inch.

The threaded barrel 1 also has a machined groove to accept a fastener 2. In certain nonlimiting embodiments, the fastener 2 can be a set screw, a bolt, a dowel, or any other suitable fastener that can prevent the barrel from rotating. The threaded barrel 1 is engaged to a threaded adjustment knob 3. Axial adjustment can occur by turning the adjustment knob 3 which moves the threaded barrel back and forth depending on the direction of the turns. In one nonlimiting embodiment, the adjustment knob 3 can be held in place by set screws 5 that lock it into a housing 4. The housing 4 holds a lens 6 in place by a retaining ring 7. The retaining ring 7 can be either screwed in or snapped in. Any materials suitable for parts used in fibers optics can be used to make the threaded barrel 1, the adjustment knob 3, the housing 4, the lens 6, the retaining ring 7, and the locking nut 8. In certain nonlimiting embodiments, the lens can be a quartz lens. In other nonlimiting embodiments, the housing and retaining ring can comprise stainless steel.

Figure 2:
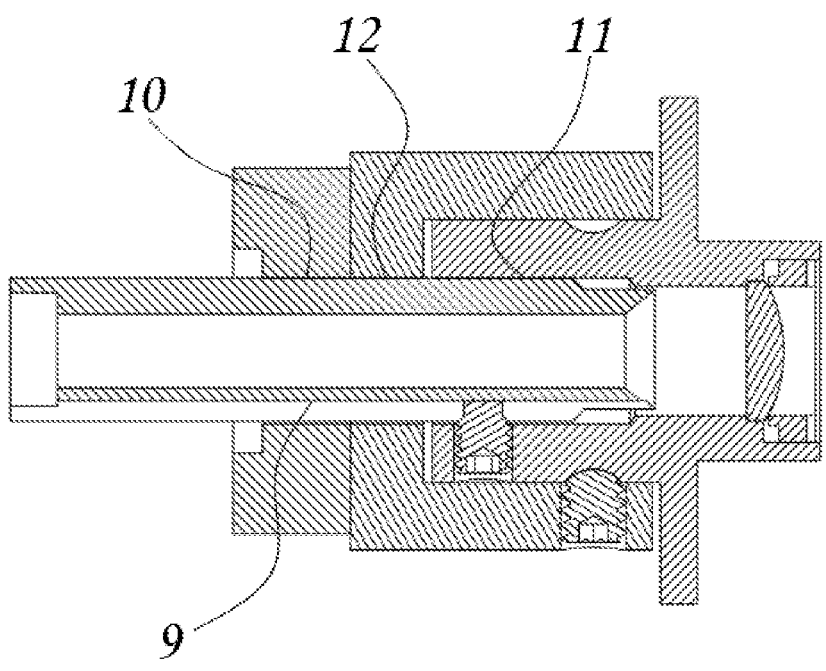
FIG. 2 is a cross-section view of an axially adjusted, non-rotating barrel fiber collimator according to some embodiments of the disclosed subject matter.

FIG. 2 is a cross-section of an axially adjusted, non-rotating barrel fiber collimator according to some embodiments of the present disclosure. It shows a channel 9 along the axis of threaded barrel 1 to accept a fastener 2. Threaded barrel 1 is mounted into the outer knob 3 at the surface 12. 11 shows the point at which the threaded barrel 1 is sliding against the unthreaded surface of the housing 4.

Figure 3:
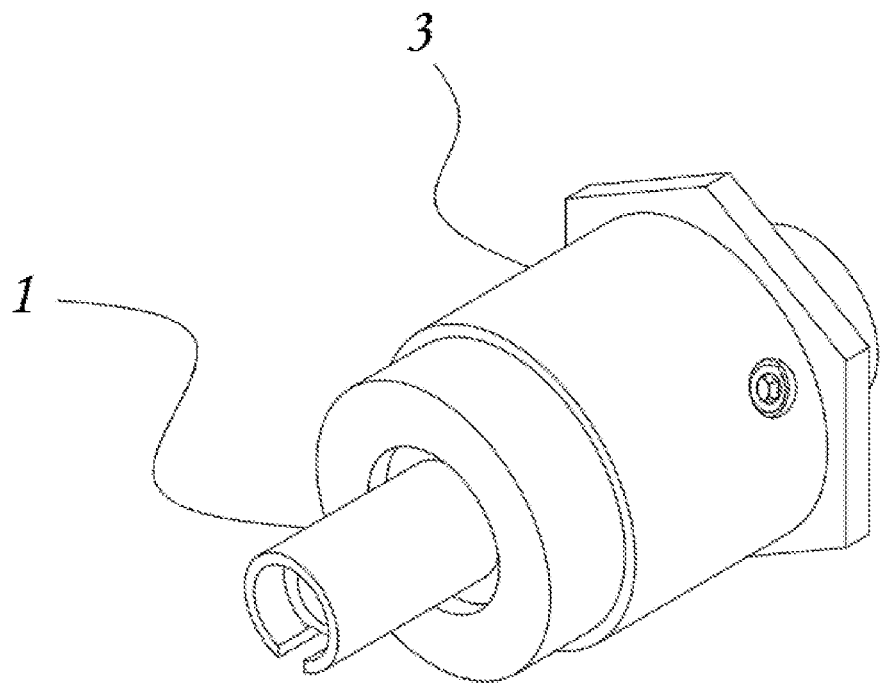
FIG. 3 is an assembled perspective view of an axially adjusted, non-rotating barrel fiber collimator according to some embodiments of the disclosed subject matter.

FIG. 3 is an assembled perspective view of an axially adjusted, non-rotating barrel fiber collimator according to some embodiments of the present disclosure. The threaded barrel 1 is inside the adjustment knob 3.

In certain nonlimiting embodiments, the distance between a fiber end and the lens assembly can be adjusted by turning the adjustment knob. Turning of the outer knob 3 causes the threaded barrel 1 to travel along its axis and changing the distance from the end of the fiber to the lens. The precise axial adjustments can allow for easy production of a well-collimated light by positioning the end of the optical fiber at the focal point of the lens. Additionally, or alternatively, the precise axial adjustment can provide for coupling of free-space beams or light sources to optical fibers.

This can be accomplished by turning the Outer Knob (3) to cause the barrel (1) to travel along its axis and changing the distance from the tip of the fiber to the lens. By doing that the user can locate the tip of the fiber at the focal point of the lens. Importantly, axial adjustment of the threaded barrel avoids a loosening of the optical fiber that is attached to the threaded barrel.

In certain nonlimiting embodiments, the axial movement can be locked by restricting the movement of the outer knob 3 by tightening the set screws 5. Furthermore, the threaded barrel 1 can be additionally constrained by the housing bore at the surface 12 and then locked in place by the locking nut at the surface 10 to provide for better stability of the optical fiber. This rigid optical setup can be essential for a stable optical signal.

In another nonlimiting embodiment, the threaded barrel has a machined groove to provide a channel 9. Set screws 5 can be mounted in the channel as shown in FIG. 2. This channel allows for outgassing through the groove in the barrel, thereby making the device vacuum-use compatible. Additionally, or alternatively, the outer knob 3 can have a hole to allow gasses to escape.

In another nonlimiting embodiment, the threaded barrel 3 can be substituted with a pulley, in order to enable the assembly to be used with a motor and enabling the automatic adjustment using a motor controlled via feedback.

The description herein merely illustrates the principles of the disclosed subject matter. Various modifications and alterations to the described embodiments will be apparent to those skilled in the art in view of the teachings herein. Accordingly, the disclosure herein is intended to be illustrative, but not limiting, of the scope of the disclosed subject matter. Moreover, the principles of the disclosed subject matter can be implemented in various configurations and are not intended to be limited in any way to the specific embodiments presented herein.

In addition to the various embodiments depicted and claimed, the disclosed subject matter is also directed to other embodiments having other combinations of the features disclosed and claimed herein. As such, the particular features presented herein can be combined with each other in other manners within the scope of the disclosed subject matter such that the disclosed subject matter includes any suitable combination of the features disclosed herein. The foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the systems and methods of the disclosed subject matter without departing from the spirit or scope of the disclosed subject matter. Thus, it is intended that the disclosed subject matter include modifications and variations that are within the scope of the appended claims and their equivalents.

The invention claimed is:

1. A fiber positioning device comprising:
   a housing,
   a fastener,
   a threaded barrel, adjustably coupled to the housing at a first portion thereof, wherein the threaded barrel comprises a groove to provide a channel, and wherein the threaded barrel is configured to accept an optical cable, wherein the channel is configured to accept the fastener along the axis of the threaded barrel to prevent the threaded barrel from rotating,
   a lens assembly, coupled to the housing at a second portion thereof and positioned at a first distance from the threaded barrel, a threaded adjustment knob having a hole, coupled to the housing and configured to change a distance between the threaded barrel and the lens assembly from the first distance to a second distance by moving the threaded barrel back and forth depending on the direction of the turns, wherein the threaded barrel is configured for engagement to the knob such that an axial movement of the threaded barrel occurs by turning the knob, a set of screws that hold the knob in place and lock the knob into the housing, further configured to lock the axial movement of the threaded barrel by restricting movement of the knob by tightening the set of screws, to thereby hold the knob in place, and a locking nut coupled to the threaded barrel.

2. The fiber positioning device of claim 1, wherein the fastener is one of a set screw, a bolt, or a dowel.

3. The fiber positioning device of claim 1, wherein the lens assembly includes a collimating lens or one or more lenses.

4. The fiber positioning device of claim 1, further comprising a retaining ring, wherein the housing holds the lens assembly by screwing in or snapping in.

\* \* \* \* \*